United States Patent
Krinski et al.

(10) Patent No.: US 6,291,559 B1
(45) Date of Patent: Sep. 18, 2001

(54) SOY PROTEIN THICKENER

(75) Inventors: Thomas L. Krinski, Franklin, IL (US); K. C. Hou, White Pinen Ridge, MO (US)

(73) Assignee: Protein Technologies International, St. Louis, MO (US)

( * ) Notice: Subject to any disclaimer, the term of this patent is extended or adjusted under 35 U.S.C. 154(b) by 0 days.

(21) Appl. No.: 09/314,299

(22) Filed: May 19, 1999

(51) Int. Cl.⁷ ................................. C08J 5/10; C08L 89/00
(52) U.S. Cl. ................................................. 524/17; 524/20
(58) Field of Search ........................................ 524/17, 20

(56) References Cited

U.S. PATENT DOCUMENTS

| | | | |
|---|---|---|---|
| 2,246,466 | * 6/1941 | Julian et al. | 260/112 |
| 2,274,983 | * 3/1942 | Hieronymus | 260/112 |
| 4,352,692 | 10/1982 | Krinski et al. | 106/79 |
| 4,421,564 | 12/1983 | Graham et al. | 106/154 |
| 4,474,694 | 10/1984 | Coco et al. | 260/123.5 |
| 4,554,337 | 11/1985 | Krinski et al. | 527/201 |
| 4,607,089 | 8/1986 | Riley et al. | 527/201 |
| 4,675,351 | * 6/1987 | Brown | 524/20 |
| 4,687,826 | 8/1987 | Steinmetz et al. | 527/201 |
| 4,689,381 | 8/1987 | Krinski et al. | 527/201 |
| 4,713,116 | 12/1987 | Krinski et al. | 106/154.1 |
| 4,812,550 | 3/1989 | Erickson et al. | 527/201 |
| 4,961,788 | 10/1990 | Krinski et al. | 106/154 |
| 4,963,604 | 10/1990 | Coco et al. | 524/17 |
| 4,997,682 | 3/1991 | Coco | 427/362 |

* cited by examiner

Primary Examiner—James J. Seidleck
Assistant Examiner—U. K. Rajguru
(74) Attorney, Agent, or Firm—Richard B. Taylor

(57) ABSTRACT

An improved vegetable protein adhesive binder which can be used in paper coating compositions at much lower levels than conventional vegetable protein adhesive binders while imparting to the paper coating composition rheological and other properties equivalent to conventional paper coating compositions containing higher levels of vegetable protein adhesive binders is prepared by forming an alkaline dispersion of a vegetable protein material and a polyacrylate, mixing the polyacrylate and the vegetable protein material at a temperature and for a time sufficient to achieve entanglement of the polyacrylate with the vegetable protein material, and co-precipitating the vegetable protein material and polyacrylate at the isoelectric point of the vegetable protein. The resulting vegetable protein material which is entangled with a polyacrylate can be advantageously employed as a vegetable protein adhesive binder in a paper coating composition comprising pigments, a polymer latex, and the vegetable protein adhesive binder.

20 Claims, No Drawings

SOY PROTEIN THICKENER

FIELD OF THE INVENTION

This invention relates to paper coating compositions containing protein and particularly hose containing modified vegetable protein as an adhesive binder.

BACKGROUND OF THE INVENTION

Vegetable protein materials are well known as adhesive binders for paper coating compositions containing pigments. The paper coating compositions provide the paper with a desirable finish, gloss, smoothness, and microporous surface. The functions of the pigment in the coating composition are to fill irregularities of the paper surface and to produce an even and uniformly absorbent surface for printing. The adhesive functions to bind the pigment particles to each other as well as to the surface of the base paper.

Particularly preferred vegetable protein materials for use as adhesive binders in paper coating compositions are modified soy proteins. These adhesive binders are typically prepared from an isolated soy protein modified by hydrolysis and other chemical treatments to prepare a protein adhesive material suitable for use as a binder in paper coating compositions.

Although such compositions have found wide usage in the paper coating industry, it would be desirable to provide improved vegetable protein binders which can be used at lower levels in paper coating compositions to achieve suitable rheological properties in the coating compositions while also exhibiting functional properties comparable to conventional paper coating compositions.

SUMMARY OF THE INVENTION

The present invention provides an improved vegetable protein adhesive binder which can be used in paper coating compositions at much lower levels than conventional vegetable protein adhesive binders while imparting to the paper coating compositions rheological and other properties equivalent to conventional paper coating compositions containing higher levels of vegetable protein adhesive binders. In particular, the vegetable protein adhesive binders of this invention perform an enhanced thickening function which allows lower amounts of the vegetable protein adhesive binder to be utilized to provide a paper coating composition exhibiting desirable rheological properties. More specifically, the vegetable protein adhesive binders of this invention have an enhanced thickening effect so that a lower amount of a vegetable protein adhesive binder in accordance with the invention can be used in a paper coating composition to achieve viscosity levels comparable to conventional paper coating compositions containing a higher level of a conventional vegetable protein adhesive binder.

In accordance with an aspect of the invention, a vegetable protein adhesive binder exhibiting enhanced rheological properties comprises a vegetable protein which is entangled with a polyacrylate.

In another aspect of the invention, the vegetable protein adhesive binder exhibiting enhanced rheological properties comprises a vegetable protein entangled with a polyacrylate which is combined with a pigment or pigments, a polymer latex, and other minor coating additives to form a paper coating composition.

The vegetable protein adhesive binders exhibiting enhanced rheological properties are prepared by coprocessing an alkaline dispersion of a vegetable protein material and a polyacrylate at a temperature and for a time sufficient to entangle the vegetable protein with the polyacrylate, then co-precipitating both protein and entangled polyacrylate. The resulting product has superior properties in a paper coating, application relative to conventional protein adhesives which do not contain an entangled polyacrylate, even in paper coating systems to which a polyacrylate has been added without entangling polyacrylate with the protein adhesive as provided herein.

DESCRIPTION OF THE PREFERRED EMBODIMENTS

Various vegetable protein materials which are suitable as an adhesive binder in paper coating compositions may be used in the practice of this invention. However, the most commonly produced protein isolates and protein concentrates are derived from soy. Accordingly, the preferred embodiments of the invention will be described with respect to soy protein materials because this is the primary area of concern for which the present invention was developed. However, it is apparent that other protein materials and vegetable protein materials can be employed in a similar manner if desired.

For purposes of explanation, the process and product of the present invention will be described in relation to a soy protein material prepared from defatted soybean flakes or flour. Defatted soybean flakes or flour may be produced according to conventional processes in which whole soybeans are cleaned, cracked, flaked, and defatted (either mechanically or chemically), and, in the case of flour, ground. Defatted soybean flakes and flour are commercially available and may be acquired as a starting material for the process of the present invention.

The defatted soybean flakes or flour are used to prepare a dispersion of soy protein. The defatted soybean flakes or flour are extracted with an aqueous alkaline solution to extract and solubilize the protein into the solution The extract containing the protein is then separated from the alkali insoluble solids by conventional filtration or centrifugation. The extract or dispersion of the protein from the soy flakes will typically have a pH of between about 8 to 12. Alternatively, a commercially available soy protein isolate may be used as the starting material for the process of the present invention by forming an alkaline dispersion of the dried protein material, preferably having a pH of from about 8 to about 12, where an alkaline dispersion of the soy protein isolate may be formed by mixing the protein isolate in an aqueous alkaline solution. The particular type of aqueous alkaline solution used to disperse the protein material, either from soy flakes or from a soy protein isolate, is not critical to the practice of the invention and generally any type of aqueous alkali or alkaline earth hydroxide, preferably an aqueous sodium or calcium hydroxide solution, or other materials, such as ammonium hydroxide may be readily employed in preparing the protein dispersion.

A polyacrylate is added to the protein dispersion and the dispersion containing the added polyacrylate is treated at a temperature and for a time sufficient to entangle at least a portion of the polyacrylate in the protein. The polyacrylate can be generally any polymer or copolymer of one or more vinyl carboxylic acid esters, such as alkyl ester acrylate or methacrylate. Copolymers of vinyl carboxylic acid esters containing minor amounts of other copolymerizable monomers may also be employed. Examples of commercially available polyacrylates which are suitable for use in the invention include ACRYSOL® TT-615, available from Rohm & Haas Company; and ALCOGUM® L-289, available from Alco Chemical Industries, Inc. The polyacrylate is preferably added in an amount of from about 1.5% to about 10%, by weight, of the weight of the protein material, although a lower amount or a higher amount may also be employed. It is believed that an optimum balance between improved properties and cost is achieved when the amount of polyacrylate used is from about 5 3% to about 6%, by weight, of the weight of the protein material.

In an alternative embodiment, the polyacrylate may be dispersed in an aqueous solution and the protein may be added to the solution to disperse the protein in the solution. The solution may be made alkaline either before or after the addition of the protein to thoroughly disperse the protein in the solution, and preferably is raised to a pH of from about 8 to about 12 with a suitable alkali, alkaline earth hydroxide, or other base such as ammonium hydroxide. This approach is particularly effective when the protein is a protein isolate from which alkali insoluble materials have been removed since the polyacrylate may be prediluted in the aqueous solution before the protein is added to the solution.

The polyacrylate and protein materials are mixed for a period of time under temperature conditions sufficient to cause physical entanglement between the protein material and the polyacrylate. The temperature should be sufficient to cause the protein to unfold or become denatured without substantially hydrolyzing the protein, where "hydrolysis" as used in this context refers to cleavage of amino acids and/or peptides from the body of the protein. Unfolding the protein is necessary to physically entangle the polyacrylate and the protein. Temperatures sufficient to unfold the protein to entangle the polyacrylate without hydrolysis of the protein range from about 40° C. to about 65° C. Preferably the dispersion containing the protein and polyacrylate is treated at a temperature of from about 50° C. to about 65° C. to entangle the protein and polyacrylate.

The protein and polyacrylate dispersion is treated at the temperatures described above for a time sufficent to allow the protein and polyacrylate to become effectively entangled. As used herein, the term "effectively entangled" means entangled to an extent that upon co-precipitation the entangled protein and polyacrylate are effective to impart a significant thickening effect when incorporated into a paper coating composition relative to a conventional protein adhesive. The time period sufficient to effectively entangle the protein material and the polyacrylate is dependent on the temperature at which the protein and polyacrylate are entangled, where longer time periods are required at lower temperatures. The time period that the dispersion is held at a temperature effective to cause entanglement of the protein and polyacrylate must be sufficiently long to allow the protein to unfold an appreciable amount, and preferably is at least 10 minutes. Holding the dispersion at a temperature effective to cause entanglement for longer time periods enables the protein to become substantially unfolded and promotes entanglement of the protein and polyacrylate. Therefore, it is preferred to hold the dispersion of protein and polyacrylate at a temperature effective to promote their entanglement for a period of at least 30 minutes, and more preferably for at least 1 hour. Most preferably, the dispersion of protein and polyacrylate are treated at a temperature and for a time sufficient to entangle at least 75% of the polyacrylate, by weight, in the protein material.

After treating the protein and polyacrylate dispersion at a temperature and for a time sufficient to entangle the protein and polyacrylate, the dispersion is adjusted to a pH at about the isoelectric point of the protein to co-precipitate the entangled protein and polyacrylate. In the case of a soy protein isolate/polyacrylate co-precipitate, the dispersion may be adjusted to a pH of from about 3.7 to about 4.6 to co-precipitate the entangled protein and polyacrylate. Any suitable commercially available mineral acid or low molecular weight organic acid may be used to adjust the pH of the dispersion, including hydrocholoric acid, sulfuric acid, and acetic acid. The co-precipitated vegetable protein material/polyacrylate may be washed, filtered, pressed, dewatered and dried according to conventional protein processing methods to provide a product with suitable shelf stability which is useful in paper coating compositions.

The vegetable protein adhesive binder formed by method of the present invention contains a sufficient amount of polyacrylate entangled therein to render the vegetable proten adhesive significantly more viscous in paper coating compositions than conventional vegetable protein adhesives alone or a non-entangled blend of a conventional protein adhesive and a polyacrylate. The vegetable protein adhesive binder of the present invention contains at least about 1.125% polyacrylate entangled in a vegetable protein material, by weight. More preferably, the vegetable protein adhesive binder contains from about 1.5% to about 7.5% polyacrylate entangled in a vegetable protein material, by weight, and most preferably contains from about 2.25% to about 4.5% polyacrylate entangled in a vegetable protein material, by weight.

In a preferred embodiment, a reducing agent is added to the protein dispersion prior to, or concurrent with, addition of the polyacrylate to the vegetable protein dispersion to achieve the desired entanglement between the vegetable protein and the polyacrylate. While the invention is not limited to any particular theory, it is believed that reaction of the protein material with the reducing agent cleaves disulfide bonds in the protein material. Cleavage of the disulfide bonds causes the protein to at least partially unfold and reorganize from a globular shape to a more irregular shape in which linear segments of the protein are more accessible for entanglement with the polyacrylate.

The reducing agent is preferably added to the alkaline dispersion on at least a stoichiometric basis to the level of disulfide bonds or sulfur containing amino acids in the solubilized protein dispersion. The particular type of reducing agent that may be employed in the present invention is not critical. Preferred compounds include those containing free or available sulfhydryl groups, such as thioglycolic acid or salts of thioglycolic acid. Most preferably, ammonium thioglycolate may be used as a reducing agent. Other suitable reducing agents include sulfur dioxide, sodium sulfite, sodium bisulfite, sodium sulfide, sodium thiosulfate, mercaptoethanol, and other compounds containing free sulhydryl groups. Preferred levels of reducing agents, such as thioglycolic acid or ammonium thioglycolate, are between about 0.2% and 2%, and most preferably between 0.5% and 1.5%, by weight of the dispersed protein. It is desirable to maintain the pH of the dispersion at from about 8 to about 11 during the reaction of the protein material with the reducing agent. The reaction between the reducing agent and the protein material is preferably carried out at a temperature of from about 40° C. to about 65° C. and more preferably from about 50° C. to about 65° C.

In a further preferred embodiment, the vegetable protein dispersion may also be reacted with a carboxylic acid anhydride to carboxylate the protein material and impart improved paper coating composition rheological characteristics to the resulting vegetable protein adhesive binder. Generally any carboxylic acid anhydride or mixtures thereof are considered to be useful for purposes of the present invention. Preferred carboxylic acid anhydrides include phthalic anhydride, succinic anhydride, acetic anhydride, and maleic anhydride. The carboxylic acid anhydride can be added to the alkaline protein dispersion in any suitable manner, such as in finely divided or ground form, or in a solution with a solvent that does not react with any of the constituents of the protein dispersion. The amount of carboxylic acid anhydride which may be added is an amount sufficient to modify the protein material and impart improved rheological characteristics to the vegetable protein adhesive binder when it is employed in a paper coating composition containing pigments. Preferred amounts of carboxylic acid anhydride are from about 2% to about 10% by weight of the protein in the alkaline protein dispersion, and more preferably from about 4% to about 6%. Desirably, reaction between the protein and the carboxylic acid anhydride is performed at a temperature of from about 40° C. to about 65° C. and at a pH of from about 8 to about 11. The preferred temperature and pH ranges maintain reactivity of the amine groups on the protein molecule which are modified by a reaction with the carboxylic acid anhydride, without causing excessive hydrolysis.

In accordance with a most preferred embodiment, the polyacrylate and a reducing agent are added to the protein dispersion at about the same time, the dispersion is treated at a temperature and for a time sufficient to entangle the vegetable protein material and the polyacrylate, and then the entangled protein/polyacrylate material in the dispersion is treated with a carboxylic acid anhydride since it has been found that the resulting protein adhesive has improved performance characteristics. In another embodiment, a polyacrylate is added to the protein dispersion after the protein material has been treated with a reducing agent and reacted with a carboxylic acid anhydride. However, some benefit may be realized without reacting the protein with a reducing agent, without reacting the protein material with a carboxylic acid anhydride, or without reacting the protein material with a reducing agent and with a carboxylic acid anhydride.

In another embodiment, the dispersion of entangled protein/polyacrylate, whether modifed by reduction or reaction with a carboxylic acid anhydride or not, is treated with a stablizing and bleaching agent such as hydrogen peroxide to further improve the biostablity and other properties of the resulting protein adhesive for use in paper coating compositions. The treatment is typically conducted with between about 3 to 25% of hydrogen peroxide or sodium peroxide, based on the weight of the protein. Other stabilizing materials, such ammonia, sodium silicate, and other materials may also be used to treat the protein material. The stabilizing and bleaching agents are oxidizing materials which are used in an amount which is effective to impart increased stability and room temperature shelf life to coating compositions containing the vegetable protein adhesive binder. The oxidizing treatment may be conducted at a temperature of from about 30° C. to about 70° C. for about 30 minutes to 6 hours. The oxidizing treatment, in addition to improving biostability and shelf life, also imparts improved properties in terms of the overall optical characteristics of the coated paper. In particular, the oxidizing treatment provides a vegetable protein adhesive binder which when used in a paper coating composition achieves increased whiteness of the coatings, and exceptional gloss and brightness.

After the vegetable protein adhesive binder of the present invention has been formed and dried, the dried binder may be further treated with agents for improving the quality of the product. The dried binder may be treated with a wetting agent, for example between about 2% to 7% propylene glycol. Other anti-caking and flow-enhancing materials may also be added, such as fumed silica at from about 0.1% to about 0.6% of the weight of the vegetable protein adhesive binder on a dry basis.

In an alternate embodiment, a vegetable adhesive binder in accordance with the present invention may be formed by modifying a conunercially available protein adhesive binder by entangling the commercially available protein adhesive binder and a polyacrylate. Commercially available protein adhesive binders may inherently have modifications such as described above and may have been carboxylated, reduced, or treated with a stabilizing or bleaching agent, or have undergone other modifications in the course of their production. Accordingly, the characteristics of the commercially available protein adhesive binder for treatment according to the process of the present invention should be selected according to the characteristics desired in the end product.

The commercially available protein adhesive binder is dispersed in an aqueous solution as described above with respect to a soy protein isolate. The solution may contain a polyacrylate therein, or a polyacrylate material may be added to the solution after the protein adhesive binder is dispersed therein. The solution is adjusted to a pH of from about 8 to 12 with a suitable base to disperse the protein in the solution. The dispersion may be reduced and/or carboxlyated as described above, if desired. The dispersion is then treated at a temperature and for a time sufficient to significantly entangle the protein and the polyacrylate as described above. The entangled protein and polyacrylate are preferably treated with a stablizing and bleaching agent as described above, and the entangled protein and polyacrylate are co-precipitated by adjusting the pH of the dispersion to about the isoelectric point of the protein. A modified protein adhesive binder according to the present invention may then be recovered by separating the co-precipitate from the dispersion.

A paper coating composition having a reduced amount of vegetable protein adhesive binder relative to a conventional paper coating composition, but with comparable rheological and other properties, may be formed by combining a vegetable protein adhesived binder formed in accordance with the present invention with a conventional paper coating pigment and a polymer latex in an aqueous solution. Preferably a paper coating composition formed in accordance with the present invention will contain up to about 3% of the improved vegetable protein adhesive binder by weight of the combined weight of the pigment, the polymer latex, and the vegetable protein adhesive binder, and more preferably will contain from about 0.5% to about 1.5% of the vegetable protein adhesive binder by weight of the combined pigment, polymer latex, and protein adhesive binder. The pigments useful in paper coating compositions of the present invention include all pigments useful in paper coating compositions containing vegetable protein adhesive binders, and specifically include titanium dioxide, satin white, calcim carbonate, and various commercially available clay pigments. The polymer latex useful in a paper coating composition of the present invention may be any conventional polymer latex useful in paper coating compositions containing vegetable protein adhesive binders, and specifically includes styrene-butadiene polymer latex, styrene acrylic butadiene latex, isoprene polymer latex, and chloroprene polymer latex.

The present invention is illustrated in more detail by the following examples. The examples are intended to be illustrative, and should not be interpreted as limiting or otherwise restricting the scope of the invention.

EXAMPLE 1

To alkaline soy protein extracts having a protein concentration of from about 3% to about 5% are added 1.25% ammonium thioglycolate (reducing agent) based on the dry weight of the protein material and 4.5% phthalic anhydride based on the dry weight of the protein material. Throughout the reaction of the protein material with the ammonium thioglycolate and the phthalic anhydride, the alkaline dispersion is maintained at a pH of 9.5. Thereafter, ACRYSOL® TT615 is added in an amount of from about 3% to 5% based on the weight of the protein. The ACRYSOL® TT615 (polyacrylate) is mixed with the modified protein (treated with a reducing agent and phthalic anhydride) for about 1 hour at a temperature of about 60° C. to entangle the protein and the polyacrylate. Thereafter, pH is adjusted to 4.1 with sulfuric acid. Hydrogen peroxide (35% active) is added in an amount of about 22.5% based on the weight of the protein, and mixed for 30 minutes to provide an oxidizing treatment which improves the biostability of the resulting adhesive binder. The solid materials are then separated by centrifugation, dried and ground to produce a fine powder. The resulting soy protein adhesive binder is comprised of about 5% polyacrylate and about 95% protein by weight.

EXAMPLE 2

For purposes of comparison, a protein extract which is substantially identical to the protein extract used in EXAMPLE 1 is wet blended with ACRYSOL® TT615, but is not subjected to conditions effective to entangle the protein and polyacrylate, to produce a dispersion in which the protein constitutes 95% of the total weight of the protein and polyacrylate.

EXAMPLE 3

Paper coating compositions are prepared by combining 100 parts by weight of No. 2 clay pigment with 12 parts by weight of Dow 620 polymer latex and various amounts of different vegetable protein adhesive binders as shown in Table 1. A first coating composition ("Sample 1") is prepared with 3 parts by weight of PRO-COTE® 400 (a conventional protein isolate employed in paper coatings available from Protein Technologies International). A second coating composition ("Sample 2") is prepared with 3 parts by weight of the adhesive binder from EXAMPLE 1. A third coating composition ("Sample 3") is prepared with 1.5 parts by weight of the adhesive binder from EXAMPLE 1, and a fourth paper coating composition ("Sample 4") is prepared with 1 part by weight of the adhesive binder of EXAMPLE 1. A fifth adhesive composition ("Sample 5") is prepared with the wet blended adhesive binder of EXAMPLE 2, with the amount of adhesive binder being 1.5 parts by weight of protein and polyacrylate. The solids content for each of the coating compositions is adjusted to various levels as indicated in Table 1. The theological properties are evaluluated of the various coating compositions having various solids content and containing various binders as indicated in Table 1. Specifically, the Brookfield viscosity is determined at 10, 20, 50 and 100 rpm, and the Hercules viscosity is determined at 4400 rpm (E Bob). The water holding capacity and the pH of the various coating compositions are also indicated in Table 1.

TABLE 1

| Binder | % Solids | Brookfield RVT @ 25° C. (cps) | | | | Hercules (cps) | pH | Water Holding |
| | | 10 rpm | 20 rpm | 50 rpm | 100 rpm | 4400 rpm | | g/m² |
| --- | --- | --- | --- | --- | --- | --- | --- | --- |
| Sample 1 | 64.5 | 18300 | 11500 | 6240 | 4000 | — | 8.51 | — |
| | 62.4 | 9600 | 6150 | 3420 | 2230 | 128 | | 77 |
| | 60.2 | 4960 | 3220 | 1870 | 1250 | 65 | | 82 |
| | 58.2 | 2330 | 1860 | 1090 | 728 | 48 | | 89 |
| | 56.1 | 1710 | 1140 | 682 | 464 | 26 | | 96 |
| Sample 2 | 59.5 | 26700 | 16500 | 8720 | 5390 | — | 8.52 | — |
| | 57.6 | 16200 | 10000 | 5400 | 3360 | 63 | | 66 |
| | 55.6 | 10000 | 6400 | 3520 | 2200 | 43 | | 72 |
| | 53.3 | 6120 | 4010 | 2260 | 1460 | 31 | | 77 |
| | 51.4 | 4560 | 2980 | 1680 | 1090 | 25 | | 80 |
| Sample 3 | 64.4 | 22000 | 13000 | 6661 | 4150 | — | 8.55 | 89 |
| | 61.3 | 9400 | 5850 | 3200 | 2030 | 74 | | 93 |
| | 59.5 | 6060 | 3720 | 2020 | 1270 | 46 | | 103 |
| | 57.1 | 3730 | 2320 | 1270 | 810 | 31 | | 113 |
| Sample 4 | 64.5 | 12600 | 7800 | 4160 | 2620 | 136 | 8.49 | 104 |
| | 62.6 | 6760 | 4280 | 2340 | 1500 | 57 | | 111 |
| | 60.1 | 3500 | 2250 | 1280 | 836 | 43 | | 118 |
| | 57.5 | 1770 | 1160 | 684 | 461 | 28 | | 127 |
| Sample 5 | 62.8 | 12500 | 7500 | 3880 | 2400 | — | 8.58 | — |
| | 60.3 | 5480 | 3400 | 1880 | 1160 | 50 | | 102 |
| | 58.1 | 3140 | 1990 | 1100 | 706 | 30 | | 110 |
| | 55.9 | 1750 | 1130 | 632 | 427 | 18 | | 116 |
| | 53.8 | 1090 | 710 | 404 | 288 | 13 | | 127 |

The results show that the adhesive binder of EXAMPLE 1 imparts higher viscosity to coating compositions than an equivalent amount of a conventional soy protein adhesive binder (compare the results for binder nos. 1 and 2). The adhesive binder of EXAMPLE 1 also imparts higher viscosity to paper coating compositions than an equivalent amount of a wet blended combination of protein and polyacrylate (compare the results for binder nos. 3 and 5). The results also indicate that a paper coating composition containing somewhere between about 1 part to about 1.5 parts of the adhesive binder of EXAMPLE 1 (actually about 1.25 parts) provides rheological properties which are approximately equivalent to compositions containing 3 parts by weight of a conventional protein adhesive binder. The results also indicate that the paper coating compositions containing the adhesive binder of EXAMPLE 1 exhibit improved water holding capacity.

EXAMPLE 4

Various paper coating compositions are prepared in a manner similar to the compositions of EXAMPLE 3 (i) to compare the theological and water retention properties of coating compositions containing various soy protein adhesive binders; (ii) to determine the effects of carboxylic anhydride treatment; and (iii) to compare the effects of spray drying versus oven drying. The coating compositions shown in Table 2 are prepared by combining 100 parts of No. 2 clay, with variable amounts of soy protein adhesive binder and variable amounts of Dow 620 (styrene-butadiene latex). The total parts of soy protein adhesive binder and polymer latex is 13 parts in each case.

A first sample, designated "Conventional-Phthalated" in Table 2, is prepared with 3 parts by weight of PRO-COTE® 400, a conventional protein isolate which is reduced and modified by phthalation with phthalic anhydride, and 10 parts of polymer latex. The first sample is prepared at various solids levels as indicated in Table 2. A second sample, designated "Non-phthalated, Spray-Dried" in Table 2, is prepared by treating a protein isolate with ammonium thioglycolate (reducing agent) and ACRYSOL® TT615 (polyacrylate) at a temperature of 60° C. for 1 hour in accordance with the present invention. The soy protein adhesive binder used in the second sample is also treated with hydrogen peroxide to provide improved shelf life and other improved properties as set forth above. The resulting soy protein adhesive binder is spray dried, and comprises 95% protein and about 5% polyacrylate. The second sample is used in an amount of 1 part to 12 parts of polymer latex in paper coating compositions prepared at various solids levels as shown in Table 2. A third sample is prepared in a manner substantially identical to the second sample except that the binder is oven dried, rather than spray dried, and 1.5 parts of the binder and 11.5 parts of polymer latex are used to prepare the paper coating compositions. The third sample is designated "Non-phthalated, Oven-dried" in Table 2, and is used to prepare paper coating compositions at various solids levels as shown in Table 2. A fourth sample is prepared in a manner substantially identical to the third sample except that the protein isolate used to prepare the binder is modified by phthalation with phthalic anhydride. The fourth sample is oven dried and utilized to prepare paper coating compositions in an amount of 1.5 parts to 11.5 parts of polymer latex. The fourth sample is designated "Phthalated, oven-dried" in Table 2, and is used to prepare paper coating compositions at various solids levels as shown in Table 2.

The coating rheologies of the four samples are measured at various solids levels by determining the Brookfield viscosity at 25° C. (in centipoise) at 10 rpm, 20 rpm, 50 rpm, and 100 rpm, and by determining the Hercules viscosity at 25° C. at 4400 rpm. The water holding capacity is also determined from each of the samples at each solids level.

| Sample | % Solids | Brookfield Viscosity @ 25° C. (cps) | | | | Hercules (cps) | Water Retention |
| --- | --- | --- | --- | --- | --- | --- | --- |
| | | 10 rpm | 20 rpm | 50 rpm | 100 rpm | 4400 rpm | |
| Sample 1 | 63.8 | 20000 | 11600 | 5760 | 3460 | 97 | 71 |
| Conventional-phthal. | 60.5 | 7600 | 4480 | 2300 | 1420 | 53 | 81 |
| 3 parts | 57.5 | 3200 | 2010 | 1100 | 690 | 33 | 84 |
| | 53.3 | 1160 | 760 | 424 | 287 | 18 | 99 |
| | 49.5 | 444 | 308 | 190 | 158 | 13 | 111 |
| Sample 2 | 64.4 | 41200 | 22000 | 9960 | 5560 | — | 156 |
| Non-phthal-S.D. | 60.7 | 10200 | 5700 | 2700 | 1560 | 39 | 181 |
| 1 part | 57.5 | 5060 | 2880 | 1400 | 824 | 22 | 201 |
| | 53.5 | 2270 | 1300 | 656 | 400 | 12 | 232 |
| | 49.5 | 1340 | 780 | 390 | 246 | 9 | 252 |
| Sample 3 | 62.0 | 26800 | 15000 | 7100 | 4080 | 47 | 105 |
| Non-phthal-O.D. | 59.9 | 13100 | 7450 | 3580 | 2100 | 22 | 116 |
| 1.5 parts | 56.8 | 6320 | 3740 | 1900 | 1140 | 16 | 122 |
| | 53.8 | 3330 | 1990 | 1050 | 657 | 11 | 124 |
| | 49.7 | 1210 | 800 | 458 | 300 | 7 | 151 |
| Sample 4 | 66 | 26000 | 15500 | 7960 | 4850 | 94 | 90 |
| Phthal.-O.D. | 63 | 9880 | 6000 | 3140 | 1960 | 50 | 103 |
| 1.5 parts | 59 | 4680 | 2880 | 1550 | 982 | 30 | 112 |
| | 56 | 2580 | 1620 | 890 | 571 | 23 | 110 |
| | 52 | 1190 | 760 | 424 | 280 | 17 | 121 |

The results show that lower amounts of protein adhesive binders in accordance with the invention can be used to achieve viscosities comparable to a conventional protein binder used in a conventional amount. The results also show that the coating compositions containing the protein adhesive binders of the invention exhibit improved water holding capacity. The results also demonstrate that improved properties can be achieved with either protein binders which have been subjected to a carboxylic acid anhydride treatment (phthalated), or with protein binders which have not been subjected to carboxylic acid anhydride treatment (non-phthalated). The results also show that suitable adhesive binders can be prepared by spray drying or oven drying.

Various changes and alterations can be made to the preferred embodiments of the invention without departing from the spirit and broader aspects of the invention as set forth in the appended claims, which are to be interpreted in accordance with the principles of patent law, including the doctrine of equivalents.

What is claimed is:

1. An adhesive binder for use in paper coating compositions, comprising a co-precipitated vegetable protein material and polyacrylate, where said polyacrylate and said vegetable protein material in said co-precipitated vegetable protein material and polyacrylate are physically entangled.

2. The vegetable protein adhesive binder of claim 1, wherein the vegetable protein material is a soy protein material.

3. The vegetable protein adhesive binder of claim 1, wherein said polyacrylate is present in said binder in at least 1.125% of the weight of the protein material in said binder.

4. The vegetable protein adhesive binder of claim 3 wherein said polyacrylate is present in said binder from about 1.5% to about 7.5% by weight of the protein material in said binder.

5. The vegetable protein adhesive binder of claim 1 wherein said protein material in said binder is carboxylated.

6. The vegetable protein adhesive binder of claim 1 wherein said protein material in said binder is reduced.

7. The vegetable protein adhesive binder of claim 1 wherein said binder is oxidized.

8. A method of preparing a vegetable protein adhesive binder comprising:

forming an alkaline dispersion of a vegetable protein material and a polyacrylate;

treating the dispersion at a temperature and for a time sufficient to entangle said polyacrylate and said vegetable protein material; and co-precipitating said polyacrylate and said vegetable protein material from said dispersion.

9. The method of claim 8 in which said vegetable protein material is soy protein material.

10. The method of claim 8 wherein said alkaline dispersion of said vegetable protein material and said polyacrylate has a pH of from about 8.0 to about 12.0.

11. The method of claim 8 wherein said alkaline dispersion of said vegetable protein material and said polyacrylate contains said polyacrylate in an amount of from about 1.5% to about 10%, by weight, of the weight of said vegetable protein material.

12. The method of claim 8 wherein said dispersion is treated at a temperature of from about 40° C. to about 65° C. to entangle said polyacrylate and said vegetable protein material.

13. The method of claim 8 wherein said alkaline dispersion is treated for a time of about at least 10 minutes to entangle said polyacrylate and said vegetable protein material.

14. The method of claim 8 in which said protein material and said polyacrylate are co-precipitated by adjusting the pH of the dispersion to a pH of from about 3.7 to about 4.6.

15. The method of claim 8 further comprising separating and drying the co-precipitated polyacrylate and vegetable protein material.

16. The method of claim 15, wherein said separation is achieved by filtration or centrifugation, and said drying is achieved by spray drying or oven drying.

17. The method of claim 8 in which said dispersion is treated with a reducing agent in an amount sufficient to cleave disulfide bonds in said vegetable protein material.

18. The method of claim 8 further comprising treating said dispersion with a carboxylic acid anhydride in an amount sufficient to modify said vegetable protein material.

19. The method of claim 8 in which said alkaline dispersion of said vegetable protein material and said polyacrylate is treated with an oxidizing agent.

20. The method of claim 8 in which the concentration of vegetable protein material in said alkaline dispersion is from about 1% to about 10% by weight of the dispersion.

* * * * *